US010392535B2

(12) United States Patent
Imai et al.

(10) Patent No.: US 10,392,535 B2
(45) Date of Patent: Aug. 27, 2019

(54) BINDER RESIN FOR INORGANIC PARTICLE-DISPERSED PASTES AND INORGANIC PARTICLE-DISPERSED PASTE

(71) Applicant: SHOEI CHEMICAL INC., Shinjuku-ku, Tokyo (JP)

(72) Inventors: Takamasa Imai, Tosu (JP); Seiyu Teruya, Tosu (JP); Kousuke Nishimura, Tosu (JP)

(73) Assignee: SHOEI CHEMICAL INC., Shinjuku-ku, Tokyo (JP)

( * ) Notice: Subject to any disclaimer, the term of this patent is extended or adjusted under 35 U.S.C. 154(b) by 0 days.

(21) Appl. No.: 15/504,557

(22) PCT Filed: Jul. 22, 2016

(86) PCT No.: PCT/JP2016/071532
§ 371 (c)(1),
(2) Date: Feb. 16, 2017

(87) PCT Pub. No.: WO2017/014295
PCT Pub. Date: Jan. 26, 2017

(65) Prior Publication Data
US 2018/0223134 A1   Aug. 9, 2018

(30) Foreign Application Priority Data

Jul. 22, 2015  (JP) .................................. 2015-145345
Jul. 23, 2015  (JP) .................................. 2015-146217

(51) Int. Cl.
*C09J 101/28*  (2006.01)
*C08K 3/00*   (2018.01)
(Continued)

(52) U.S. Cl.
CPC ............... *C09J 101/28* (2013.01); *C08K 3/00* (2013.01); *C08K 5/09* (2013.01); *C08K 5/29* (2013.01);
(Continued)

(58) Field of Classification Search
CPC .......... C09J 101/28; C09J 129/14; C09J 9/02; C08L 1/28; C08L 29/14; H01B 1/22
See application file for complete search history.

(56) References Cited

U.S. PATENT DOCUMENTS 9,845,397 B2 * 12/2017  Akashi ................... C08G 18/56
2001/0006451 A1 *  7/2001  Miyazaki ................ B32B 18/00
                                                             361/321.2
(Continued)

FOREIGN PATENT DOCUMENTS

JP       59-45373 A     3/1984
JP     2000-076930 A    3/2000
(Continued)

OTHER PUBLICATIONS

International Search Report for PCT/JP2016/071532 (2 pgs.).
(Continued)

*Primary Examiner* — Nicholas E Hill
(74) *Attorney, Agent, or Firm* — Flynn Thiel, P.C.

(57) ABSTRACT

A binder resin for an inorganic particle-dispersed paste that excels in both printability and adhesiveness and such an inorganic particle-dispersed paste are provided. The resin includes a mixture in which a polyvinyl acetal and a cellulose derivative are mixed so as to satisfy $0.2 \leq X/(X+Y) \leq 0.8$, where X and Y stand for parts by mass of the polyvinyl acetal and the cellulose derivative, respectively. When a paste is formulated by mixing and kneading the resin with spherical nickel particles with an average particle diameter of 0.3 μm, barium titanate particles with an average particle
(Continued)

diameter of 0.05 μm, a nonionic surfactant, dihydroterpineol, and mineral spirit at the prescribed mixing ratio, the paste has prescribed rheological characteristics.

15 Claims, 3 Drawing Sheets

(51) Int. Cl.
| | |
|---|---|
| C08K 5/09 | (2006.01) |
| C08K 5/29 | (2006.01) |
| C08L 29/14 | (2006.01) |
| C08L 71/02 | (2006.01) |
| H01B 1/22 | (2006.01) |
| C09J 9/02 | (2006.01) |
| C09J 11/04 | (2006.01) |
| C09J 129/14 | (2006.01) |
| H01G 4/008 | (2006.01) |
| H01G 4/012 | (2006.01) |
| H01G 4/30 | (2006.01) |
| C08L 1/08 | (2006.01) |
| C09J 101/08 | (2006.01) |
| H01G 4/12 | (2006.01) |

(52) U.S. Cl.
CPC ............. *C08L 1/08* (2013.01); *C08L 29/14* (2013.01); *C08L 71/02* (2013.01); *C09J 9/02* (2013.01); *C09J 11/04* (2013.01); *C09J 101/08* (2013.01); *C09J 129/14* (2013.01); *H01B 1/22* (2013.01); *H01G 4/0085* (2013.01); *H01G 4/012* (2013.01); *H01G 4/30* (2013.01); *H01G 4/1227* (2013.01)

(56) References Cited

U.S. PATENT DOCUMENTS

2008/0283188 A1* 11/2008 Oda .................. C01G 49/0018
                                                                 156/277
2011/0275021 A1* 11/2011 Nakamura ........... G03C 1/7614
                                                                 430/496

FOREIGN PATENT DOCUMENTS

| JP | 2000-76930 A | 3/2000 | |
|---|---|---|---|
| JP | 2001-232617 A | 8/2001 | |
| JP | 2004-186339 A | 7/2004 | |
| JP | 2005-116504 A | 4/2005 | |
| JP | 2006-202502 A | 8/2006 | |
| JP | 2008-285589 A | 11/2008 | |
| JP | 2009-182128 A | 8/2009 | |
| JP | 2012-174797 A | 9/2012 | |
| WO | WO-2015107811 A1 * | 7/2015 | ............ C08G 18/56 |
| WO | 2016/017463 A1 | 2/2016 | |

OTHER PUBLICATIONS

European Search Report in the English language issued in European Patent Application No. 16827855.4 dated Mar. 4, 2019 (7 pages).

* cited by examiner

BINDER RESIN FOR INORGANIC PARTICLE-DISPERSED PASTES AND INORGANIC PARTICLE-DISPERSED PASTE

TECHNICAL FIELD

The present invention relates to a binder resin for an inorganic particle-dispersed paste and to an inorganic particle-dispersed paste, and more particularly to a binder resin and an inorganic particle-dispersed paste having prescribed rheological characteristics.

BACKGROUND ART

Capacity increase and miniaturization of multilayer electronic components, e.g. multilayer ceramic capacitors (MLCC), are under way at a fast pace.

In a MLCC, ceramic green sheets including a high-dielectric material such as barium titanate, and layers formed from an electrically conductive paste mainly including an electrically conductive material, a binder resin, and a solvent, are alternately laminated in a large number and then dried and fired so as to obtain a chip with alternately laminated dielectric layers and electrode layers. Following the increase in capacity of MLCC, a demand is being created for a larger number of layers along with a reduction in the thickness of each such layer, and this is causing a variety of production problems. One particular problem is that the film strength of the electrode layers and the adhesion of the electrode layers to the dielectric material sheets have become insufficient, and this may cause some defects or result in the electrode layers peeling off from the interfaces with the dielectric layers. Further, as the particle size of the electrically conductive material is reduced, dispersivity thereof in the binder resin is degraded. The resulting problem is that the formed electrodes are not uniform, the capacity of the obtained MLCC is decreased, and an electric short circuit tends to occur more easily.

In these circumstances, a study has been conducted on the use of a mixed resin as a binder resin for an electrically conductive paste, where the mixed resin is obtained by mixing a cellulose derivative having excellent printability with a butyral-based resin or acrylic resin which excels in mechanical strength and adhesion to a green sheet [see PTL (Patent Literature) 1)]. Furthermore, using a specific solvent in addition to a well-known cellulose-based resin or an acryl-based resin in an electrically conductive paste (see PTL 2) and using a specific acrylic resin and solvent in addition to a well-known cellulose-based resin in an electrically conductive paste (see PTL 3) have also been studied.

PTL 4 also discloses the use of a mixed resin. It is indicated in this PTL that a ceramic green layer is formed so as to compensate step-like sections provided by an electrode layer formed on a green sheet, and a mixture of polyvinyl butyral and cellulose ester is used as a binder resin in a ceramic slurry of the ceramic green layer to compensate for the step-like sections (see PTL 4).

CITATION LIST

Patent Literature

PTL 1: Japanese Patent Application Publication No. 2000-76930
PTL 2: Japanese Patent Application Publication No. 2006-202502
PTL 3: Japanese Patent Application Publication No. 2009-182128
PTL 4: Japanese Patent Application Publication No. 2001-232617

SUMMARY OF INVENTION

Technical Problem

However, an investigation of the mixed binder resins disclosed in the abovementioned related art has revealed a problem in that, as compared to the case where an electrically conductive paste is fabricated using only a cellulose derivative, an electrically conductive paste fabricated using the abovementioned mixed binder resins has a more elastic rheological characteristic and decreased homogeneity of the dry film. When such mixed binder resins are used for the internal electrodes of MLCCs, there is a possibility of the capacity being decreased due to the non-uniformity of the internal electrodes and reliability dropping due to printing defects.

The present invention has been made to resolve the abovementioned problems, and it is an objective thereof to provide a binder resin for an inorganic particle-dispersed paste that excels in both printability and adhesiveness, and also to provide such an inorganic particle-dispersed paste.

Solution to Problem

In order to resolve the abovementioned problems, according to one aspect of the present invention, there is provided:

a binder resin for an inorganic particle-dispersed paste, the resin including a mixture in which a polyvinyl acetal and a cellulose derivative are mixed so as to satisfy $0.2 \leq X/(X+Y) \leq 0.8$, where X and Y stand for parts by mass of the polyvinyl acetal and the cellulose derivative, respectively, wherein when a paste is obtained by mixing 6 parts by mass, calculated as a solid, of the resin with 100 parts by mass of spherical nickel particles with an average particle diameter of 0.3 μm, 10 parts by mass of barium titanate particles with an average particle diameter of 0.05 μm, 0.5 parts by mass of a nonionic surfactant, 68 parts by mass of dihydroterpineol, and 17 parts by mass of mineral spirit, and kneading the same by using a three-roll mill, the paste is as follows:

in a case where strains of 0.02 and 0.2 are applied to the paste at an angular frequency of 6.284 rad/s, a value of a phase difference δ between each of the strains and a stress caused by each strain is greater than 45°; and a ratio of a viscosity of the paste at a shear rate of 4 (1/s) to a viscosity thereof at a shear rate of 40 (1/s) is 4.5 or less.

According to another aspect of the present invention, there is provided:

an inorganic particle-dispersed paste including:
a binder resin including a mixture in which a polyvinyl acetal and a cellulose derivative are mixed so as to satisfy $0.2 \leq X/(X+Y) \leq 0.8$, where X and Y stand for parts by mass of the polyvinyl acetal and the cellulose derivative, respectively;
inorganic particles; and
an organic solvent, wherein
a total amount of the binder resin, the inorganic particles, and the organic solvent with respect to the inorganic particle-dispersed paste is 95 mass % or more,
in a case where strains of 0.02 and 0.2 are applied to the paste at an angular frequency of 6.284 rad/s, a value of a phase difference δ between each of the strains and a stress caused by each strain is greater than 45°; and a ratio of a viscosity of the paste at a shear rate of 4 (1/s) to a viscosity thereof at a shear rate of 40 (1/s) is 4.5 or less.

Advantageous Effects of Invention

According to the present invention, it is possible to provide a binder resin for an inorganic particle-dispersed paste that excels in both printability and adhesiveness, and also to provide such an inorganic particle-dispersed paste.

DESCRIPTION OF EMBODIMENTS

Figure 1:
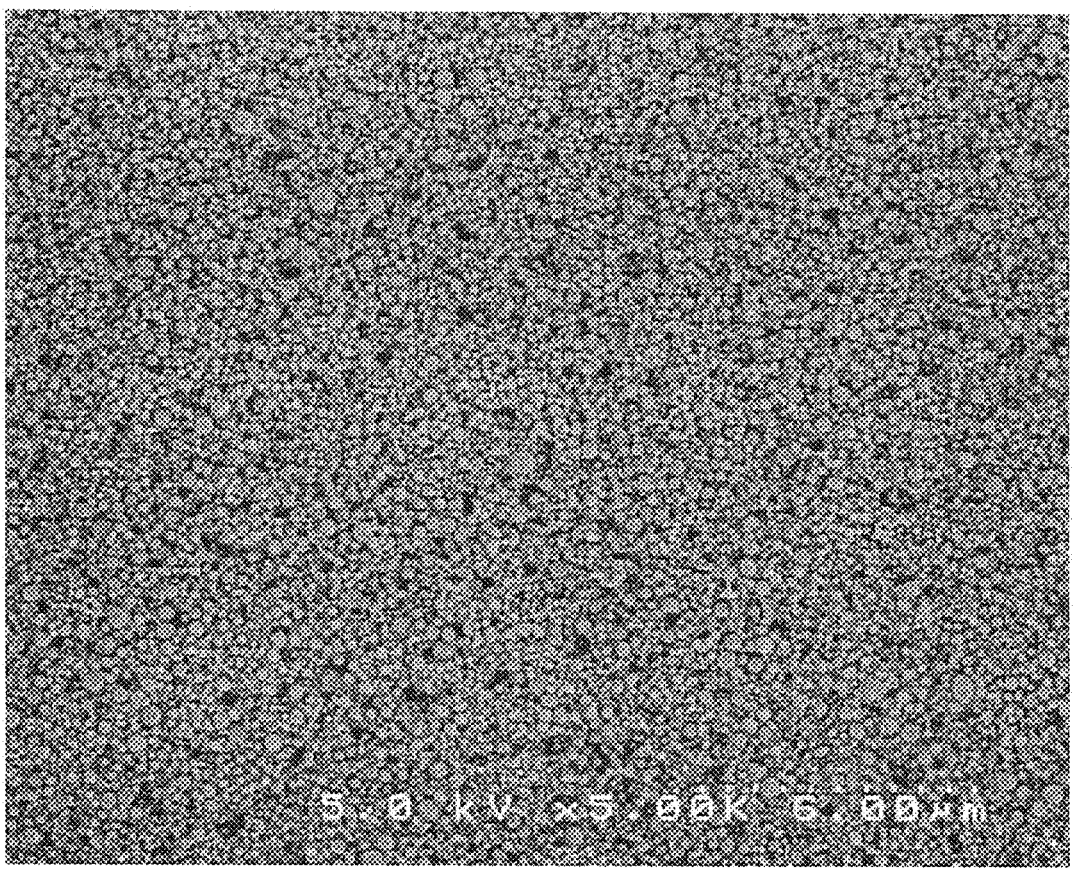
FIG. 1 is an SEM photograph of a dry film of an electrically conductive paste using Sample 5.

A preferred embodiment of the present invention is described hereinbelow in detail. In the present description, numerical ranges expressed by connecting values with the term "to" include the numerical values stated before and after the term "to". For example, "2 parts by mass to 15 parts by mass" indicates a range of at least 2 parts by mass and not more than 15 parts by mass, both inclusive.

Binder Resin for Inorganic Particle-Dispersed Paste

The binder resin for an inorganic particle-dispersed paste of the present invention includes a mixture in which a polyvinyl acetal and a cellulose derivative are mixed so as to satisfy $0.2 \leq X/(X+Y) \leq 0.8$, where X and Y stand for parts by mass of the polyvinyl acetal and the cellulose derivative, respectively.

Further, when a paste is obtained by mixing 6 parts by mass, calculated as a solid, of the binder resin with 100 parts by mass of spherical nickel particles with an average particle diameter of 0.3 μm, 10 parts by mass of barium titanate particles with an average particle diameter of 0.05 μm, 0.5 parts by mass of a nonionic surfactant, 68 parts by mass of dihydroterpineol, and 17 parts by mass of mineral spirit, and kneading the resultant mixture by using a three-roll mill, the paste is as follows. In a case where strains of 0.02 and 0.2 are applied to the paste at an angular frequency of 6.284 rad/s, the value of a phase difference δ between each of the strains and a stress caused by each strain is greater than 45°. In addition, a ratio (viscosity ratio) of the viscosity of the paste at a shear rate of 4 (1/s) to the viscosity thereof at a shear rate of 40 (1/s) is 4.5 or less.

Regarding an inorganic particle-dispersed paste, when the value of the phase difference δ thereof is 45° or less, the paste has an elastic property, and when the value of the phase difference δ thereof is greater than 45°, the paste has a viscous property. Where the binder resin of the present invention is formulated into a paste under the abovementioned prescribed conditions, the value of the phase difference δ is greater than 45°. Further, where the binder resin of the present invention is formulated into a paste under the abovementioned prescribed conditions, the viscosity ratio becomes as small as 4.5 or less. Therefore, it can be expected that a saddle effect during printing will be reduced and leveling ability will be improved. Further, it is preferred that the phase difference δ be greater than 50° and that the viscosity ratio be 4 or less. In this manner, further improved effects can be expected. Unless specifically stated otherwise, the "phase difference δ", as referred to in the present invention, is a phase difference between each strain, i.e., 0.02 or 0.2 and the stress caused by each strain, when the strain of 0.02 or 0.2 is applied to the paste at an angular frequency of 6.284 rad/s. The tangent (tan δ) of the phase difference δ is a ratio of a loss elastic modulus to a storage elastic modulus (tan δ=(loss elastic modulus)/(storage elastic modulus)). Therefore, the degree of viscosity of the paste can be known from the tangent of the phase difference δ. When represented in percentages, the strains 0.02 and 0.2 are 2% and 20%, respectively.

Further, in accordance with the provision of the prescribed rheological characteristics (phase difference δ, viscosity ratio), a binder resin providing both favorable printability and favorable adhesiveness can be obtained without inhibiting the properties of the polyvinyl acetal, which excels in adhesiveness (adhesivity) and mechanical strength, and the cellulose derivative which excels in printability.

Furthermore, it suffices for the binder resin of the present invention to be a binder resin that satisfies the abovementioned prescribed rheological characteristics when formulated into a paste under the abovementioned prescribed conditions, and the binder can be used not only when being formulated into a paste under the abovementioned prescribed conditions but also when being formulated into a paste under other conditions. For example, the binder may be formulated into an inorganic particle-dispersed paste at a mixing ratio that is different from the abovementioned mixing ratio, and also it may be formulated into an inorganic particle-dispersed paste using other inorganic particles. In these cases as well, excellent printability and adhesiveness can be obtained.

Components of the binder resin will be explained hereinbelow.

In the description hereinbelow, the terms "resin" and "polymer" are sometimes used to express the same thing.

(A) Polyvinyl Acetals

Polyvinyl butyral, polyvinyl formal and the like are preferred as the polyvinyl acetal. Polyvinyl acetals are resins obtained by using a polyvinyl alcohol, which is obtained by hydrolysis of polyvinyl acetate, as a starting material, and acetalizing this starting material, and various polyvinyl acetals are commercially available in which hydroxyl groups and acetyl groups, in addition to acetal groups, are present at a variety of quantities in the molecules of the polyvinyl acetals.

(B) Cellulose Derivatives

A cellulose derivative is a polymer material that can be selected from methyl cellulose, ethyl cellulose, propyl cellulose, nitrocellulose, acetyl cellulose and the like. It is particularly preferred that ethyl cellulose, which excels in printability, e.g. in screen printing, be used. Ethyl cellulose is obtained by subjecting cellulose to alkali treatment and then ethyl etherification. Commercially available are ethyl cellulose products obtained by ethyl etherifying on average 2 to 2.8 of three hydroxyl groups present in a glucose ring.

The preferred molecular weights of the abovementioned polyvinyl acetal and cellulose derivative are within a range of 10,000 to 500,000, as a number-average molecular weight. An even more preferred molecular weight is in a range of 20,000 to 150,000, as a number-average molecular weight. With the polyvinyl acetal and cellulose derivative with molecular weights within this range, a more remarkable effect of the present invention is demonstrated.

The polyvinyl acetal and cellulose derivative are mixed such that $0.2 \leq X/(X+Y) \leq 0.8$, where X and Y stand for parts by mass of the polyvinyl acetal and cellulose derivative, respectively. The polyvinyl acetal and cellulose derivative are preferably mixed such that $0.3 \leq X/(X+Y) \leq 0.7$. Within these ranges, properties of both the polyvinyl acetal and the cellulose derivative can be demonstrated.

(C) Carboxylic Acid

A carboxylic acid, which is an optional component in the binder resin for an inorganic particle-dispersed paste, is an organic acid having one or more carboxyl groups. By using a carboxylic acid, the prescribed rheological characteristics can be easily obtained. It is not clear why such an effect is demonstrated, but the inventors suppose that this effect is due to interaction of a carboxyl group contained in the carboxylic acid and a hydroxyl group contained in at least one of the polyvinyl acetal and cellulose derivative.

Examples of suitable carboxylic acids include monocarboxylic acids such as acetic acid, octanoic acid, and glycolic acid; dicarboxylic acids such as phthalic acid, aliphatic dicarboxylic acids with a carbon number of 3 to 30 such as adipic acid, suberic acid, and sebacic acid, poly(ethylene glycol) bis(carboxymethyl) ether and a modified silicone having a carboxyl group at both ends; and anhydrides thereof, etc. Among them, poly(ethylene glycol) bis(carboxymethyl) ether and n-octanoic acid can be advantageously used. It is preferred that poly(ethylene glycol) bis(carboxymethyl) ether with a number-average molecular weight Mn within a range of 10 to 10,000 be used.

(D) Carbodiimide

A carbodiimide is an optional component in the binder resin for an inorganic particle-dispersed paste. By using carbodiimide, the prescribed rheological characteristics can be easily obtained.

Examples of suitable carbodiimides include such readily available compounds as N,N'-diisopropylcarbodiimide, N,N'-dicyclohexylcarbodiimide, 1-[3-(dimethylamino)propyl]-3-ethylcarbodiimide, hydrochlorides thereof, etc., and also N-[3-(dimethylamino)propyl]-N'-ethylcarbodiimide, N-[3-(dimethylamino)propyl]-N'-ethylcarbodiimide methiodide, N-tert-butyl-N'-ethylcarbodiimide, N-cyclohexyl-N'-(2-morpholinoethyl)carbodiimide metho-p-toluenesulfonate, N,N'-di-tert-butylcarbodiimide, N,N'-di-p-tolylcarbodiimide, etc. Among them, N,N'-diisopropylcarbodiimide and 1-[3-(dimethylamino)propyl]-3-ethylcarbodiimide are prerably used.

(E) Accelerator

An accelerator, which is an optional component in the binder resin for an inorganic particle-dispersed paste, accelerates the interaction of the polymers with the carboxylic acid and/or carbodiimide.

By adding a basic catalyst such as dimethylaminopyridine, and triethylamine as the accelerator, for example, in a range of 0.01 mass % to 10 mass % with respect to the carbodiimide, it is possible to shorten the mixing time and increase the production efficiency.

A binder resin according to the preferred embodiment of the present invention may include a third polymer in addition to the abovementioned polyvinyl acetal and cellulose derivative.

An acrylic resin, an acrylic resin derivative, polyurethane, a polyester, polystyrene, a polystyrene derivative or the like can be used as the third polymer. These third polymers can be included singly or a combination of a plurality thereof in the binder resin.

The binder resin can be obtained by the following production method.

Method for Production of Binder Resin for Inorganic Particle-Dispersed Paste

A method for producing the binder resin for the inorganic particle-dispersed paste includes a step of mixing the abovementioned polyvinyl acetal and cellulose derivative. Further, when using the abovementioned carboxylic acid and/or carbodiimide, the polyvinyl acetal, cellulose derivative and carboxylic acid and/or carbodiimide may be mixed at the same time, or the carboxylic acid and/or carbodiimide may be mixed with at least one of the polyvinyl acetal and cellulose derivative, followed by mixing all the components.

Explained hereinbelow in detail is a production method including a two-stage mixing process in which the carboxylic acid and carbodiimide are mixed with one of the two polymers, namely, the polyvinyl acetal and the cellulose derivative, and then the resulting mixed liquid is mixed with the other one of the two polymers.

(1) First-Stage Mixing Process

Initially one of the two polymers is dissolved in an organic solvent to produce a polymer liquid. The preferred examples of the organic solvent include ethers such as tetrahydrofuran and dioxane, esters such as ethyl acetate and butyl acetate, aromatic compounds such as toluene, ketones such as methyl ethyl ketone, methyl propyl ketone, and methyl isobutyl ketone, N-methylpyrrolidone, dimethylformamide, dimethylacetamide, dimethylsulfoxide, etc. These solvents are used singly or in an appropriate mixture thereof.

The polymer concentration in the polymer liquid is preferably 1 mass % to 50 mass % and more preferably 3 mass % to 30 mass %. Where the polymer concentration in the polymer liquid is too high, the liquid viscosity increases, stirring efficiency drops, and homogeneity tends to degrade or gelling is apt to occur.

Then, the carboxylic acid and carbodiimide are added to and mixed with the polymer liquid. The amount added of the carboxylic acid differs depending on the polymer concentration in the polymer liquid, but it is preferably 0.2 parts by mass to 10 parts by mass and more preferably 1 part by mass to 6 parts by mass per 100 parts by mass of the total amount of the cellulose derivative and polyvinyl acetal. In this manner, the effect of the present invention can be easily obtained without degrading the film quality. The amount added of the carbodiimide differs depending on the polymer concentration in the polymer liquid, but it is preferably 0.1 parts by mass to 5 parts by mass and more preferably 0.5 parts by mass to 2 parts by mass per 100 parts by mass of the total amount of the cellulose derivative and polyvinyl acetal. In this manner, the effect of the present invention can be easily obtained without degrading the film quality. The preferred amount added, as referred to herein, means the total amount added in the production method of the resin for the inorganic particle-dispersed paste. For example, when the carboxylic acid is added separately in two stages, namely, the above-described (1) (First-stage mixing process) and the below-described (2) (Second-stage mixing process), it is preferred that the total amount of the carboxylic acid added in (1) and (2) be within the abovementioned range. Where the amounts of the carboxylic acid and carbodiimide are too small, the prescribed rheological characteristics may become difficult to be obtained, and where the amounts of the carboxylic acid and carbodiimide are too large, gelling may occur.

Further, an accelerator may be added, as necessary, during the addition and mixing of the carboxylic acid and carbodiimide.

(2) Second-Stage Mixing Process

First, the other one of the two polymers is dissolved in an organic solvent to produce a polymer liquid. The kind of the organic solvent and the polymer concentration in the polymer liquid are the same as in (1) (First-stage mixing process).

Then, the polymer liquid is mixed with the mixed liquid produced in (1). In the second-stage mixing process, a carboxylic acid and a carbodiimide may be caused to interact with the other polymer and, if necessary, a carboxylic acid, a carbodiimide, and an accelerator may be added.

The purification of the mixed liquid produced above can be preferably implemented by a precipitation purification method. The precipitation purification method is a method in which solid precipitates are formed by charging the produced mixed liquid into a poor solvent thereto, and the precipitates are separated. Excess starting materials and byproducts can be removed by the precipitation purification. The mixed liquid of the present invention can be purified using water, methanol, a water-methanol mixed solvent, hexane, or the like. The precipitates can be obtained as solids by separation, e.g. by filtration separation, and drying.

The purification of the mixed liquid can be also advantageously implemented by a solvent replacement method. In the solvent replacement method, an organic solvent that is to be eventually used in the paste is added to the mixed liquid, only the organic solvent which has been contained in the mixed liquid is separated by degassing so that the organic solvent in the mixed liquid is replaced with the organic solvent that is to be used in the paste using the binder resin. When the purification is implemented by the solvent replacement method, an organic solvent with a boiling point lower than that of the organic solvent that is to be used in the paste is selected as an organic solvent for use in the production of the mixed liquids in (1) and (2). As a result, a product precipitation step can be omitted, and a vehicle suitable for the paste can be directly obtained.

Inorganic Particle-Dispersed Paste and Production Method Thereof

The inorganic particle-dispersed paste according to the preferred embodiment of the present invention includes the abovementioned binder resin for an inorganic particle-dispersed paste, inorganic particles, and an organic solvent. By using the binder resin having the prescribed rheological characteristics, it is possible to increase the printability and adhesiveness, while suppressing the amount of a viscosity modifier. The viscosity modifier, as referred to herein, is an agent effective in reducing the viscosity and viscosity ratio of the inorganic particle-dispersed paste. The viscosity modifier is, for example, an anionic surfactant and, in most cases, an organic compound. The effect of the present invention can be obtained without using the viscosity modifier, but this effect sometimes can be increased by using the viscosity modifier. When the viscosity modifier is used, the amount added of the viscosity modifier is preferably 0.5 parts by mass or less per 100 parts by mass of the inorganic particles. Further, components other than the viscosity modifier sometimes can be also included in the inorganic particle-dispersed paste, and in this case, it is preferred that the amount thereof be suppressed to less than 5 mass % so that the total amount of the binder resin, inorganic particles, and organic solvent would be 95 mass % or more with respect to the inorganic particle-dispersed paste. In this manner, the degradation of film quality such as smoothness and strength of the dry film and also the amount of residual carbon after binder removal in post-processing can be suppressed. For example, when the inorganic particle-dispersed paste is used for the internal electrode of a MLCC, the degradation of characteristics of the MLCC by the degradation of film quality and residual carbon can be suppressed.

Further, the inorganic particle-dispersed paste according to a further preferred embodiment of the present invention includes a binder resin including a mixture in which a polyvinyl acetal and a cellulose derivative are mixed so as to satisfy $0.2 \leq X/(X+Y) \leq 0.8$, where X and Y stand for parts by mass of the polyvinyl acetal and the cellulose derivative, respectively; inorganic particles; and an organic solvent, wherein the total amount of the binder resin, inorganic particles, and organic solvent with respect to the inorganic particle-dispersed paste is 95 mass % or more. By setting the total amount to 95 mass % or more, it is possible to obtain the same effects as described hereinabove.

Further, in the inorganic particle-dispersed paste according to the further preferred embodiment, when strains of 0.02 and 0.2 are each applied to the paste at an angular frequency of 6.284 rad/s, the value of a phase difference δ between each strain and a stress caused by the strain is greater than 45°; and the ratio of the viscosity of the paste at a shear rate of 4 (1/s) to the viscosity thereof at a shear rate of 40 (1/s) is 4.5 or less. Since the paste has the prescribed rheological characteristics, both the printability and the adhesiveness are good.

It is further preferred that the specific surface area of the inorganic particles measured by a BET method be 5.2 $m^2/g$ or more.

Such inorganic particle-dispersed pastes can be obtained by kneading the binder resin, inorganic particles and organic solvent.

Examples of inorganic particle-dispersed pastes include electrically conductive pastes, dielectric pastes, resistor pastes, and insulating pastes. The inorganic particle-dispersed pastes of the present invention are suitable for manufacturing multilayer ceramics and electronic components such as capacitors, inductors, and resistive chips.

The electrically conductive paste includes a binder resin, electrically conductive particles as inorganic particles, an organic solvent, and additives, such as a surfactant, which are added as necessary. Meanwhile, the dielectric paste, resistor paste, and insulating paste include, for example, dielectric particles such as barium titanate, electric resistor particles such as ruthenium oxide, and insulating particles such as glass particles, respectively, as inorganic particles.

As described hereinabove, since the binder resin for the inorganic particle-dispersed paste or the inorganic particle-dispersed paste of the present invention has the prescribed rheological characteristics, the coating film formed from the inorganic particle-dispersed paste has a high dispersivity of the inorganic particles, excels in smoothness, and is less likely to have fine holes (defects). Therefore, the coating film qualities such as smoothness and denseness after firing can be greatly improved.

An electrically conductive paste is explained hereinbelow by way of example.

The electrically conductive particles are not particularly limited, and suitable examples thereof include particles of metals such as nickel, copper, cobalt, gold, silver, palladium, and platinum, and particles of alloys thereof. Electrically conductive metal oxides and composite particles obtained by coating inorganic particles of glass, ceramic, fluorescent materials, semiconductors or the like with an electrically conductive metal can be also used. Further, the abovementioned metal particles or alloy particles having a thin oxide film on their surfaces or coated with a glassy substance or various oxides to suppress oversintering may be also used.

These electrically conductive particles may be used singly or in a mixture of two or more thereof. If necessary, surface treatment may be performed with an organometallic compound, a surfactant, or fatty acids.

The particle diameter of the electrically conductive particles is not particularly limited, and particles with an average particle diameter of about 3 μm or less, such that are usually used in electrically conductive pastes for internal electrodes, are preferably used. In order to form dense and thin internal electrode layers with a high smoothness, it is preferred that fine particles with a good dispersivity and an average particle diameter of about 0.05 μm to 1.0 μm be used. In particular, the electrically conductive paste obtained in the present invention demonstrates a remarkable effect when internal electrodes of a multilayer capacitor with a large number of layers are formed in which electrically conductive particles such as very fine nickel particles or the like with an average particle diameter of 0.5 μm or less are used.

The preferred mixing ratio of the abovementioned electrically conductive particles and binder resin, that is, the mass ratio of (electrically conductive particles)/(binder resin) is within a range of 99/1 to 80/20.

Examples of the organic solvent include ketones such as methyl ethyl ketone, methyl isobutyl ketone, and acetone; hydrocarbons such as toluene, xylene, and normal hexane; alcohols such as methanol, ethanol, isopropanol, butanol, amyl alcohol, and benzyl alcohol; esters such as ethyl acetate, butyl acetate, and isobutyl acetate; tetrahydrofuran, dioxane, diisopropyl ketone, ethyl cellosolve, butyl cellosolve, cellosolve acetate, methyl cellosolve acetate, butyl carbitol, trimethyl pentanediol monoisobutyrate, cyclohexanol, pine oil, isophorone, terpineol, dipropylene glycol, dimethyl phthalate, hydrocarbons, chlorinated hydrocarbons such as methylene chloride, terpineol derivatives such as dihydroterpineol, terpineol acetate, and dihydroterpineol acetate, etc. These solvents are used singly or as an appropriate mixture thereof.

The mixing amount of the organic solvent is preferably within a range of 1 to 100 times the mass of the binder resin which is to be used.

Examples of other substances that can be added include nonionic surfactants such as polyethylene glycol derivatives and sorbitan esters, stabilizers such as antioxidants, pigments, dyes, etc. These substances can be mixed as necessary. The total amount added of these additives is preferably selected within a range of 0.01 mass % to 5 mass % with respect to the mass of the inorganic particle-dispersed paste.

The electrically conductive paste can be produced by mixing the abovementioned electrically conductive particles, binder resin, and organic solvent at a predetermined ratio and kneading by using a stirring device such as a mixer, a mill, a three-roll mill, or a Hoover Muller.

The electrically conductive paste is described hereinabove in detail by way of example, but inorganic particle-dispersed pastes other than the electrically conductive paste can be produced in a similar manner by mixing and designing a variety of the above-described inorganic particles according to the application.

EXAMPLES

The present invention will be explained hereinbelow on the basis of detailed examples thereof. The binder resin of the present invention can be produced by using various production methods such as explained hereinbelow. Among them, the binder resins produced by (1) (Two-stage mixing process) and (3) (EC mixture) are preferably used.

Production of Binder Resins (1) Samples 1 to 15, 37, 38, 40, 42, and 44 (Two-Stage Mixing Process)

The "First starting material" and "Second starting material" shown in Table 1-1 and Table 1-2 were used in the first-stage and second-stage mixing processes, respectively, and the abovementioned samples, with the exception of Samples 8 and 9, were produced in the below-described manner. The kinds of the respective components and mixed amounts thereof used in the "First starting material" and "Second starting material" are shown in Table 1-1 and Table 1-2.

Polyvinyl butyral (PVB) as a polyvinyl acetal, which was sufficiently dried by vacuum drying, was dissolved in N-methylpyrrolidone (NMP). For the samples other than Sample 15, the first-stage mixing process was implemented by adding at least one from among carboxylic acid, carbodiimide, and an accelerator to the polymer liquid obtained above, mixing, and stirring for 24 hours at 30° C. In the case of Sample 15, the first-stage mixing process was implemented without adding any of the carboxylic acid, carbodiimide, and accelerator. Here, 4-dimethylaminopyridine was used as the accelerator and the same applies to the below-described samples.

A polymer liquid was then prepared by dissolving ethyl cellulose (EC) as a cellulose derivative, which was sufficiently dried by vacuum drying, in NMP, carbodiimide was added and dissolved therein for samples other than Samples 14 and 15, the resulting mixed liquid was then mixed with the PVB mixed liquid produced in the first-stage mixing process, and the second-stage mixing process was implemented while stirring for 24 hours (168 hours for Sample 44) at 30° C. In the cases of Samples 14 and 15, the above second-stage mixing process was implemented without adding carbodiimide.

Then, a varnish-like binder resin was produced by adding the mixed liquid thus obtained to water, dissolving the NMP in water, drying at 60° C., and dissolving the resulting solid binder resin in dihydroterpineol.

In the cases of Samples 8 and 9, the organic solvent NMP used in the production of the abovementioned samples in the first-stage and second-stage mixing processes was replaced with methyl ethyl ketone (MEK) and the first and second starting materials of the respective samples which are shown in Table 1-1 were used. In Sample 9, the mixing time in each of the first-stage and second-stage mixing processes was set to 6 hours. In other aspects, the two-stage mixing process was implemented according to the same procedure as Sample 1. Then, the resulting mixed liquid was added to dihydroterpineol and degassed under heating to evaporate the MEK. As a result, binder resins dissolved in dihydroterpineol were obtained.

(2) Samples 16 to 20 (One-Stage Mixing Process)

PVB and EC, which were sufficiently dried by vacuum drying, were each dissolved in the NMP taken in the amount shown in Table 1-1. For Samples 16 to 19, a one-stage mixing process was implemented by adding at least one from among carboxylic acid, carbodiimide, and an accelerator to the thus obtained polymer liquid, mixing, and stirring for 24 hours at 30° C. to thereby obtain a mixed liquid. For Sample 20, the one-stage mixing process was implemented by using only the polymer liquid obtained above, without adding any of the carboxylic acid, carbodiimide, and accelerator, and stirring for 24 hours at 30° C.

Then, a varnish-like binder resin was produced by adding the resulting mixed liquid or the polymer liquid to water, dissolving the NMP in water, drying at 60° C., and dissolving the resulting solid binder resin in dihydroterpineol.

The kinds and mixed amounts of the PVB, carboxylic acid, carbodiimide, and accelerator used in the production of each of the samples are shown in the "First starting material" in Table 1-1. Further, the kind and mixed amount of EC are shown in the "Second starting material" in Table 1-1.

(3) Samples 21 to 27 (EC Mixture)

PVB sufficiently dried by vacuum drying was dissolved in dihydroterpineol to produce a varnish-like PVB. The kind and mixed amount of the PVB used herein are shown in the "First starting material" in Table 1-1 and Table 1-2.

EC sufficiently dried by vacuum drying was dissolved in NMP. An EC mixed liquid was produced by adding at least one from among carboxylic acid, carbodiimide, and an accelerator to the thus obtained polymer liquid, mixing, and stirring for 24 hours at 30° C. Then, the EC mixed liquid was added to water and the NMP was dissolved in water, followed by drying at 60° C. The resulting solid EC mixture was dissolved in dihydroterpineol to produce a varnish-like EC mixture. The kinds and mixed amounts of the starting materials used herein are shown in the "Second starting material" in Table 1-1 and Table 1-2.

Then, a binder resin was produced by mixing the above-mentioned PVB and EC mixture.

(4) Samples 28 to 31 ((PVB Mixture)×(EC Mixture))

PVB sufficiently dried by vacuum drying was dissolved in NMP. A PVB mixed liquid was produced by adding carboxylic acid, carbodiimide, and an accelerator to the thus obtained polymer liquid, mixing, and stirring for 24 hours at 30° C. Then, the PVB mixed liquid was added to water and the NMP was dissolved in water, followed by drying at 60° C. The resulting solid PVB mixture was dissolved in dihydroterpineol to produce a varnish-like PVB mixture. The kinds and mixed amounts of the starting materials used herein are shown in the "First starting material" in Table 1-2.

An EC mixture was produced by the same procedure as described hereinabove by using the kinds and mixed amounts of the starting materials shown in the "Second starting material" in Table 1-2.

Then, a binder resin was produced by mixing the PVB mixture and the EC mixture.

(5) Samples 32, 39, 41, 43, and 45 (Two-Component Mixing)

Varnish-like PVB and varnish-like EC were produced by dissolving PVB and EC, which were sufficiently dried by vacuum drying, respectively in dihydroterpineol. A binder resin was then produced by mixing the PVB and the EC. The kinds and mixed amounts of PVB and EC used herein are shown in the "First starting material" and "Second starting material" in Table 1-2.

(6) Samples 33 and 35 (PVB Mixture Only or EC Mixture Only)

PVB sufficiently dried by vacuum drying was dissolved in NMP. A PVB mixed liquid was produced by adding carboxylic acid, carbodiimide, and an accelerator to the thus obtained polymer liquid, mixing, and stirring for 24 hours at 30° C. Then, the PVB mixed liquid was added to water and the NMP was dissolved in water, followed by drying at 60° C. The resulting solid PVB mixture was dissolved in dihydroterpineol to produce a varnish-like PVB of Sample 33. The kinds and mixed amounts of the starting materials used herein are shown in the "First starting material" in Table 1-2.

An EC mixture of Sample 35 was obtained in a similar manner, and a varnish-like EC was produced by dissolving the mixture in dihydroterpineol. The kinds and mixed amounts of the starting materials used herein are shown in the "Second starting material" in Table 1-2.

(7) Samples 34 and 36 (PVB or EC)

A varnish-like PVB of Sample 34 or a varnish-like EC of Sample 36 was produced by dissolving PVB or EC, which was sufficiently dried by vacuum drying, in dihydroterpineol. The kinds and mixed amounts of the PVB or EC used herein are shown in the "First starting material" and "Second starting material" in Table 1-2.

TABLE 1-1

| | | First starting material | | | | | | | | |
|---|---|---|---|---|---|---|---|---|---|---|
| | | Polyvinyl acetal | | Organic solvent | | Carboxylic acid | | Carbodiimide | | |
| Sample No. | Production method | Kind | Mixing amount (g) | Kind | Mixing amount (g) | Kind | Mixing amount (g) | Kind | Mixing amount (g) | Accelerator (mg) |
| 1 | Two-stage mixing process | A1 | 5 | NMP | 45 | C1 | 0.283 | D1 | 0.060 | 5 |
| 2 | Two-stage mixing process | A1 | 5 | NMP | 45 | C1 | 0.283 | D2 | 0.097 | 5 |
| 3 | Two-stage mixing process | A1 | 5 | NMP | 45 | C1 | 0.283 | D3 | 0.073 | 5 |
| *4 | Two-stage mixing process | A1 | 5 | NMP | 28.3 | C1 | 0.057 | D1 | 0.012 | 1 |
| 5 | Two-stage mixing process | A1 | 5 | NMP | 20 | C1 | 0.057 | D1 | 0.012 | 1 |
| 6 | Two-stage mixing process | A1 | 5 | NMP | 20 | C1 | 0.028 | D1 | 0.006 | 0.5 |
| 7 | Two-stage mixing process | A1 | 5 | NMP | 45 | C2 | 0.118 | D1 | 0.006 | 5 |
| 8 | Two-stage mixing process | A1 | 5 | MEK | 45 | C1 | 0.283 | D1 | 0.060 | 5 |
| 9 | Two-stage mixing process | A1 | 5 | MEK | 45 | C1 | 0.283 | D1 | 0.060 | 5 |
| 10 | Two-stage mixing process | A1 | 5 | NMP | 45 | C3 | 0.175 | D1 | 0.060 | 5 |
| 11 | Two-stage mixing process | A1 | 5 | NMP | 45 | C1 | 0.283 | D1 | 0.06 | — |

TABLE 1-1-continued

| Sample No. | Production method | Polyvinyl acetal Kind | Mixing amount (g) | Organic solvent Kind | Mixing amount (g) | Carboxylic acid Kind | Mixing amount (g) | Carbodiimide Kind | Mixing amount (g) | Accelerator (mg) |
|---|---|---|---|---|---|---|---|---|---|---|
| 12 | Two-stage mixing process | A1 | 5 | NMP | 45 | — | — | D1 | 0.06 | 5 |
| 13 | Two-stage mixing process | A1 | 5 | NMP | 45 | — | — | D1 | 0.06 | — |
| *14 | Two-stage mixing process | A1 | 5 | NMP | 45 | — | — | — | — | 5 |
| *15 | Two-stage mixing process | A1 | 5 | NMP | 45 | — | — | — | — | — |
| 16 | One-stage mixing process | A1 | 5 | NMP | 45 | C1 | 0.283 | D1 | 0.126 | 5 |
| 17 | One-stage mixing process | A1 | 5 | NMP | 45 | C1 | 0.283 | D1 | 0.126 | — |
| 18 | One-stage mixing process | A1 | 5 | NMP | 45 | — | — | D1 | 0.126 | — |
| *19 | One-stage mixing process | A1 | 5 | NMP | 45 | — | — | — | — | 5 |
| *20 | One-stage mixing process | A1 | 5 | NMP | 45 | — | — | — | — | — |
| 21 | EC mixture | A1 | 5 | — | — | — | — | — | — | — |
| 22 | EC mixture | A1 | 5 | — | — | — | — | — | — | — |
| 23 | EC mixture | A1 | 5 | — | — | — | — | — | — | — |

| Sample No. | Second starting material Cellulose derivative Kind | Mixing amount (g) | Organic solvent Kind | Mixing amount (g) | Carboxylic acid Kind | Mixing amount (g) | Carbodiimide Kind | Mixing amount (g) | Accelerator (mg) |
|---|---|---|---|---|---|---|---|---|---|
| 1 | B1 | 6.8 | NMP | 83.9 | — | — | D1 | 0.066 | — |
| 2 | B1 | 6.8 | NMP | 83.9 | — | — | D2 | 0.107 | — |
| 3 | B1 | 6.8 | NMP | 83.9 | — | — | D3 | 0.081 | — |
| *4 | B1 | 6.8 | NMP | 53.6 | — | — | D1 | 0.013 | — |
| 5 | B1 | 6.8 | NMP | 38.5 | — | — | D1 | 0.013 | — |
| 6 | B1 | 6.8 | NMP | 38.5 | — | — | D1 | 0.007 | — |
| 7 | B1 | 6.8 | NMP | 83.9 | — | — | D1 | 0.066 | — |
| 8 | B1 | 6.8 | MEK | 83.9 | — | — | D1 | 0.066 | — |
| 9 | B1 | 6.8 | MEK | 83.9 | — | — | D1 | 0.066 | — |
| 10 | B1 | 6.8 | NMP | 83.9 | — | — | D1 | 0.066 | — |
| 11 | B1 | 6.8 | NMP | 83.9 | — | — | D1 | 0.066 | — |
| 12 | B1 | 6.8 | NMP | 83.9 | — | — | D1 | 0.066 | — |
| 13 | B1 | 6.8 | NMP | 83.9 | — | — | D1 | 0.066 | — |
| *14 | B1 | 6.8 | NMP | 83.9 | — | — | — | — | — |
| *15 | B1 | 6.8 | NMP | 83.9 | — | — | — | — | — |
| 16 | B1 | 6.8 | NMP | 83.9 | — | — | — | — | — |
| 17 | B1 | 6.8 | NMP | 83.9 | — | — | — | — | — |
| 18 | B1 | 6.8 | NMP | 83.9 | — | — | — | — | — |
| *19 | B1 | 6.8 | NMP | 83.9 | — | — | — | — | — |
| *20 | B1 | 6.8 | NMP | 83.9 | — | — | — | — | — |
| 21 | B1 | 6.8 | NMP | 83.9 | C1 | 0.283 | D1 | 0.060 | 5 |
| 22 | B1 | 6.8 | NMP | 83.9 | C1 | 0.283 | D1 | 0.126 | 5 |
| 23 | B1 | 6.8 | NMP | 83.9 | C1 | 0.283 | D1 | 0.126 | — |

TABLE 1-2

| Sample No. | Production method | First starting material Polyvinyl acetal Kind | Mixing amount (g) | Organic solvent Kind | Mixing amount (g) | Carboxylic acid Kind | Mixing amount (g) | Carbodiimide Kind | Mixing amount (g) | Accelerator (mg) |
|---|---|---|---|---|---|---|---|---|---|---|
| 24 | EC mixture | A1 | 5 | — | — | — | — | — | — | — |
| 25 | EC mixture | A1 | 5 | — | — | — | — | — | — | — |
| 26 | EC mixture | A1 | 5 | — | — | — | — | — | — | — |
| *27 | EC mixture | A1 | 5 | — | — | — | — | — | — | — |
| 28 | (PVB mixture) × (EC mixture) | A1 | 5 | NMP | 45 | C1 | 0.283 | D1 | 0.060 | 5 |
| 29 | (PVB mixture) × (EC mixture) | A1 | 5 | NMP | 45 | C4 | 0.056 | D1 | 0.120 | 10 |
| 30 | (PVB mixture) × (EC mixture) | A1 | 5 | NMP | 45 | C5 | 0.108 | D1 | 0.180 | 15 |

TABLE 1-2-continued

| Sample No. | | Kind | Mixing amount (g) | Kind | Mixing amount (g) | Kind | Mixing amount (g) | Kind | Mixing amount (g) | Accelerator (mg) |
|---|---|---|---|---|---|---|---|---|---|---|
| 31 | (PVB mixture) × (EC mixture) | A1 | 5 | NMP | 45 | C6 | 0.068 | D1 | 0.060 | 5 |
| *32 | Two-component mixing | A1 | 5 | — | — | — | — | — | — | — |
| *33 | PVB mixture only | A1 | 5 | NMP | 45 | C1 | 0.283 | D1 | 0.060 | 5 |
| *34 | PVB | A1 | 5 | — | — | — | — | — | — | — |
| *35 | EC mixture only | — | — | — | — | — | — | — | — | — |
| *36 | EC | — | — | — | — | — | — | — | — | — |
| 37 | Two-stage mixing process | A1 | 3 | NMP | 27 | C1 | 0.283 | D1 | 0.060 | 5 |
| 38 | Two-stage mixing process | A1 | 8 | NMP | 72 | C1 | 0.283 | D1 | 0.060 | 5 |
| *39 | Two-component mixing | A1 | 8 | — | — | — | — | — | — | — |
| 40 | Two-stage mixing process | A2 | 5 | NMP | 45 | C1 | 0.484 | D1 | 0.102 | 8 |
| *41 | Two-component mixing | A2 | 5 | — | — | — | — | — | — | — |
| 42 | Two-stage mixing process | A3 | 5 | NMP | 45 | C1 | 0.484 | D1 | 0.102 | 8 |
| *43 | Two-component mixing | A3 | 5 | — | — | — | — | — | — | — |
| 44 | Two-stage mixing process | A1 | 5 | NMP | 45 | C1 | 0.283 | D1 | 0.060 | 5 |
| *45 | Two-component mixing | A1 | 5 | — | — | — | — | — | — | — |

| | Second starting material | | | | | | | | |
|---|---|---|---|---|---|---|---|---|---|
| | Cellulose derivative | | Organic solvent | | Carboxylic acid | | Carbodiimide | | |
| Sample No. | Kind | Mixing amount (g) | Kind | Mixing amount (g) | Kind | Mixing amount (g) | Kind | Mixing amount (g) | Accelerator (mg) |
| 24 | B1 | 6.8 | NMP | 83.9 | — | — | D1 | 0.126 | 5 |
| 25 | B1 | 6.8 | NMP | 83.9 | — | — | D1 | 0.126 | — |
| 26 | B1 | 6.8 | NMP | 83.9 | — | — | D3 | 0.154 | — |
| *27 | B1 | 6.8 | NMP | 83.9 | — | — | — | — | 5 |
| 28 | B1 | 6.8 | NMP | 83.9 | C1 | 0.283 | D1 | 0.060 | 5 |
| 29 | B1 | 6.8 | NMP | 83.9 | C3 | 0.056 | D1 | 0.120 | 10 |
| 30 | B1 | 6.8 | NMP | 83.9 | C5 | 0.108 | D1 | 0.180 | 15 |
| 31 | B1 | 6.8 | NMP | 83.9 | C6 | 0.068 | D1 | 0.060 | 5 |
| *32 | B1 | 6.8 | — | — | — | — | — | — | — |
| *33 | — | — | — | — | — | — | — | — | — |
| *34 | — | — | — | — | — | — | — | — | — |
| *35 | B1 | 6.8 | NMP | 83.9 | C1 | 0.283 | D1 | 0.060 | 5 |
| *36 | B1 | 6.8 | — | — | — | — | — | — | — |
| 37 | B1 | 8.8 | NMP | 108.5 | — | — | D1 | 0.066 | — |
| 38 | B1 | 3.8 | NMP | 108.5 | — | — | D1 | 0.066 | — |
| *39 | B1 | 3.8 | — | — | — | — | — | — | — |
| 40 | B2 | 6.8 | NMP | 83.9 | — | — | D1 | 0.112 | — |
| *41 | B2 | 6.8 | — | — | — | — | — | — | — |
| 42 | B1 | 6.8 | NMP | 83.9 | — | — | D1 | 0.112 | — |
| *43 | B1 | 6.8 | — | — | — | — | — | — | — |
| 44 | B3 | 6.8 | NMP | 61.2 | — | — | D1 | 0.066 | — |
| *45 | B3 | 6.8 | — | — | — | — | — | — | — |

Samples in Table 1-1 and Table 1-2 in which * was assigned to the sample No. are outside the scope of the present invention. The same applies to the below-described Table 2-1 and Table 2-2.

A1 to A3, B1 to B3, C1 to C6 and D1 to D3 in Table 1-1 and Table 1-2 are described hereinbelow.

A1: polyvinyl butyral (BM-S, manufactured by Sekisui Chemical Co., Ltd.)

A2: polyvinyl butyral (SV-06, manufactured by Sekisui Chemical Co., Ltd.)

A3: polyvinyl butyral (SV-02, manufactured by Sekisui Chemical Co., Ltd.)

B1: ethyl cellulose (STD200, manufactured by The Dow Chemical Company)

B2: ethyl cellulose (STD300, manufactured by The Dow Chemical Company)

B3: ethyl cellulose (STD45, manufactured by The Dow Chemical Company)

C1: poly(ethylene glycol) bis(carboxymethyl) ether (manufactured by Sigma-Aldrich Co. LLC., Mn=600)

C2: poly(ethylene glycol) bis(carboxymethyl) ether (manufactured by Sigma-Aldrich Co. LLC., Mn=250)

C3: branched aliphatic dicarboxylic acid (IPS-22, manufactured by Okamura Oil Mill Co., Ltd., carbon number 22)

C4: acetic acid

C5: glycolic acid

C6: octanoic acid

D1: N,N'-diisopropylcarbodiimide (DIC) (manufactured by Wako Pure Chemical Industries, Ltd.)

D2: N,N'-dicyclohexylcarbodiimide (DCC) (manufactured by Wako Pure Chemical Industries, Ltd.)

D3: 1-[3-(dimethylamino)propyl]-3-ethylcarbodiimide (WSC) (manufactured by Wako Pure Chemical Industries, Ltd.)

Production of Electrically Conductive Pastes

Electrically conducive pastes were produced by dispersing the respective binder resins, which were produced in Samples 1 to 45, together with nickel particles, barium titanate particles, and nonionic surfactant in dihydroterpineol and mineral spirit as organic solvents.

In the production of each electrically conductive paste, the components were kneaded at the below-described mixing ratio by using a three-roll mill. The dihydroterpineol was mixed so as to be contained in the following amount in the electrically conductive paste.

Binder resin: 6 parts by mass, calculated as a solid
Nickel particles (volume-based average particle diameter (D50) determined by a laser scattering method is 0.3 µm, spherical particles): 100 parts by mass
Barium titanate particles (average particle diameter determined by SEM observations: 0.05 µm): 10 parts by mass
Nonionic surfactant: 0.5 parts by mass
Dihydroterpineol: 68 parts by mass
Mineral spirit: 17 parts by mass The specific surface area of the inorganic particles (Ni particles and barium titanate particles) determined by the BET method was 6.06 m$^2$/g.

Measurements of Viscosity Ratio and Phase Difference δ

The viscosity ratio and phase difference δ of each electrically conductive paste were measured using a rheometer (AR2000, manufactured by TA Instruments, Inc.). The cone plate used had a cone diameter of 40 mm and a cone angle of 2°. The temperature was set to 25° C. The viscosity ratio was calculated by measuring a viscosity at a shear rate of 4 (1/s) and a viscosity at a shear rate of 40 (1/s), respectively, and finding a ratio of the viscosity at a shear rate of 4 (1/s) to the viscosity at a shear rate of 40 (1/s). The phase difference δ was the values determined at an angular frequency of 6.284 rad/s and at strains of 0.02 and 0.2.

The viscosity ratio and phase difference δ are shown in Table 2-1 and Table 2-2 correspondingly to the sample used.

Evaluation of Electrically Conductive Pastes (1) Printability

Evaluation of printability was performed by observing the film quality of dry film after printing.

Figure 2:
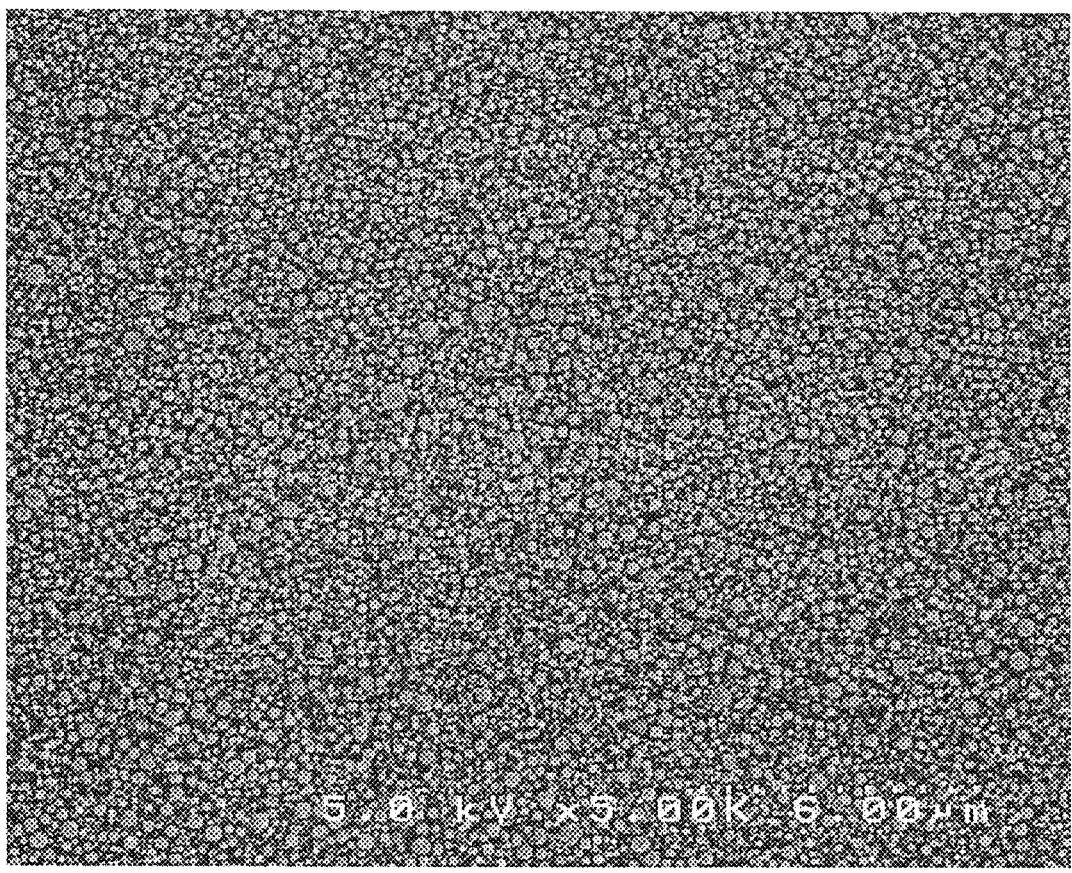
FIG. 2 is an SEM photograph of a dry film of an electrically conductive paste using Sample 8.
Figure 3:
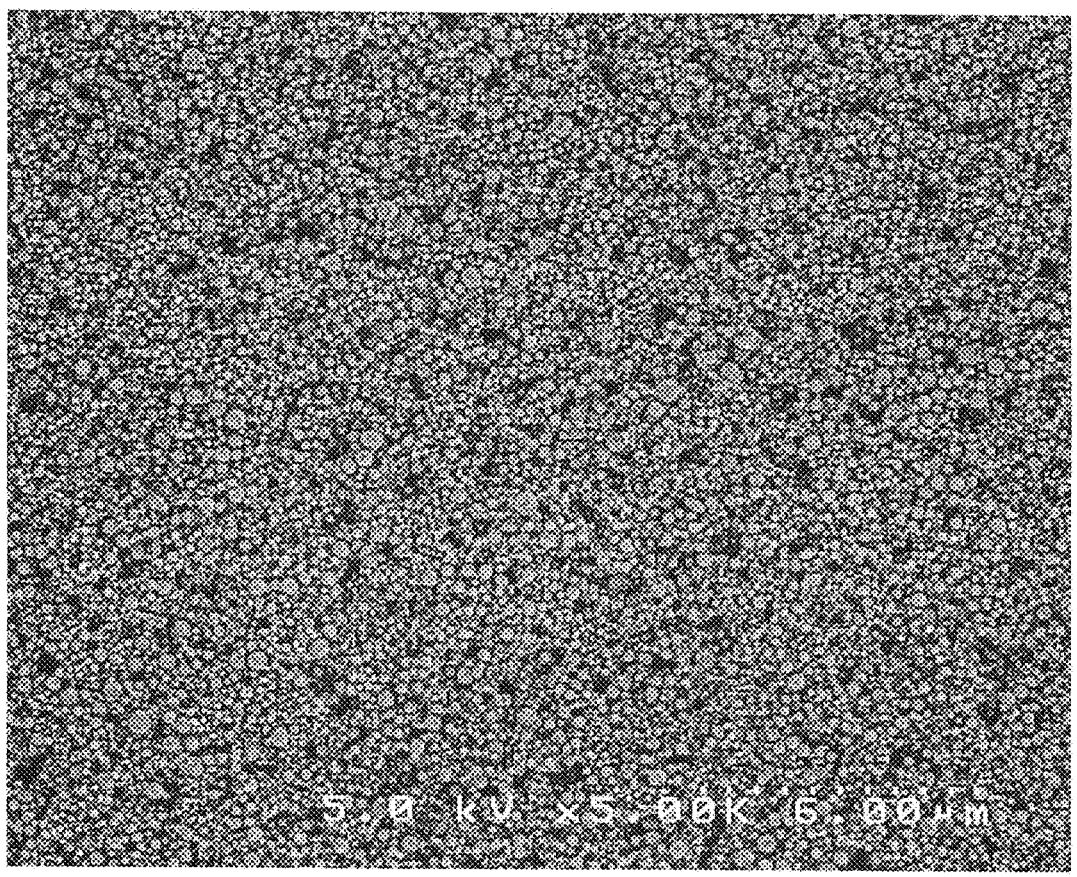
FIG. 3 is an SEM photograph of a dry film of an electrically conductive paste using Sample 32.

Initially the electrically conductive pastes were printed to a film thickens of 10 µm on a glass substrate and then dried for 10 minutes at 100° C. The film quality of the dry films was evaluated by observing the size and number of holes in a 18 µm×24 µm field of view with a SEM (electron microscope, manufactured by Hitachi High-Technologies Corporation). FIGS. 1 to 3 are SEM photographs of the dry films of the electrically conductive films used in Samples 5, 8, and 32, respectively. In the case of the film quality same as that in FIG. 1, the printability was represented by "Δ", in the case of better film quality than that in FIG. 1, the printability was represented by "O", and in the case of worse film quality than that in FIG. 1, the printability was represented by "x". More specifically, for the film quality such as in FIG. 2, the printability was "O", and for the film quality such as in FIG. 3, the printability was "x".

With the printability "O" and "Δ", no problem was associated with printability. For example, no problem was associated with product quality when the paste was used for the internal electrode of a MLCC.

(2) Adhesiveness

The electrically conductive paste was coated at a film thickness of 1 µm on a ceramic green sheet and then dried for 15 minutes at 100° C. Another ceramic green sheet was then stacked on the dry film and attached thereto under pressure. The adhesiveness was evaluated according to the state realized when the ceramic green sheet stacked on the dry film was peeled off.

The adhesiveness was evaluated as "x" when the dry film formed from of the electrically conductive paste peeled off together with the ceramic green sheet, and the adhesiveness was evaluated as "O" when the dry film did not peel off together.

With the adhesiveness "O", the electrically conductive paste could be used without any problem. For example, the paste could be used for the internal electrode of a MLCC.

The evaluation results on printability and adhesiveness are shown in Table 2-1 and Table 2-2, respectively.

TABLE 2-1

| Sample No. | Viscosity (Pa · s) | | Viscosity ratio | Phase difference δ (°) | | Printability | Adhesiveness |
|---|---|---|---|---|---|---|---|
| | Shear rate 4 (1/s) | Shear rate of 40 (1/s) | | Strain 0.02 | Strain 0.2 | | |
| 1 | 52.41 | 13.99 | 3.75 | 53.54 | 53.50 | o | o |
| 2 | 19.5 | 8.275 | 2.36 | 58.48 | 57.61 | Δ | o |
| 3 | 39 | 11.45 | 3.41 | 56.18 | 56.11 | o | o |
| *4 | 78.62 | 14.48 | 5.43 | 44.11 | 43.52 | x | o |
| 5 | 32.02 | 10.45 | 3.07 | 56.46 | 56.73 | Δ | o |
| 6 | 39.49 | 9.80 | 4.03 | 50.80 | 50.52 | Δ | o |
| 7 | 54.50 | 12.71 | 4.29 | 49.68 | 49.03 | Δ | o |
| 8 | 33.84 | 11.29 | 3.00 | 55.51 | 55.43 | o | o |
| 9 | 52.05 | 15.85 | 3.28 | 57.60 | 57.34 | o | o |
| 10 | 44.83 | 13.00 | 3.44 | 54.42 | 54.24 | o | o |
| 11 | 51.71 | 12.85 | 4.03 | 51.07 | 50.94 | o | o |
| 12 | 37.77 | 9.59 | 3.94 | 52.38 | 51.86 | o | o |
| 13 | 46.69 | 11.96 | 3.9 | 51.86 | 51.56 | o | o |
| *14 | 92.01 | 16.91 | 5.44 | 42.02 | 41.69 | x | o |
| *15 | 87.87 | 15.92 | 5.52 | 42.1 | 41.81 | x | o |
| 16 | 39.86 | 11.33 | 3.52 | 55.16 | 55.11 | o | o |
| 17 | 39.54 | 11.13 | 3.55 | 54.3 | 54.3 | Δ | o |
| 18 | 45.12 | 12.22 | 3.69 | 52.94 | 52.82 | Δ | o |
| *19 | 89.04 | 16.63 | 5.36 | 41.01 | 41.36 | x | o |
| *20 | 83.08 | 16.18 | 5.13 | 44.11 | 44.04 | x | o |

TABLE 2-1-continued

| Sample No. | Viscosity (Pa·s) | | Viscosity ratio | Phase difference δ (°) | | Printability | Adhesiveness |
| | Shear rate 4 (1/s) | Shear rate of 40 (1/s) | | Strain 0.02 | Strain 0.2 | | |
|---|---|---|---|---|---|---|---|
| 21 | 42.55 | 10.87 | 3.91 | 52.34 | 51.87 | Δ | ○ |
| 22 | 39.25 | 11.09 | 3.54 | 52.82 | 52.39 | Δ | ○ |
| 23 | 40.37 | 11.86 | 3.40 | 57.69 | 57.49 | ○ | ○ |

TABLE 2-2

| Sample No. | Viscosity (Pa·s) | | Viscosity ratio | Phase difference δ (°) | | Printability | Adhesiveness |
| | Shear rate 4 (1/s) | Shear rate of 40 (1/s) | | Strain 0.02 | Strain 0.2 | | |
|---|---|---|---|---|---|---|---|
| 24 | 38.7 | 10.52 | 3.68 | 51.07 | 50.46 | ○ | ○ |
| 25 | 37.25 | 11.075 | 3.36 | 53.38 | 53.00 | ○ | ○ |
| 26 | 17.75 | 7.6 | 2.34 | 60.21 | 59.99 | ○ | ○ |
| *27 | 78.85 | 15.11 | 5.22 | 44.37 | 43.86 | x | ○ |
| 28 | 40.25 | 12.73 | 3.16 | 58.48 | 58.48 | ○ | ○ |
| 29 | 25.38 | 9.03 | 2.81 | 57.77 | 57.37 | ○ | ○ |
| 30 | 28.09 | 10.04 | 2.80 | 58.32 | 57.92 | ○ | ○ |
| 31 | 33.54 | 9.90 | 3.39 | 54.00 | 54.10 | ○ | ○ |
| *32 | 73.56 | 12.70 | 5.79 | 40.62 | 39.95 | x | ○ |
| *33 | 2.70 | 0.94 | 2.87 | 36.62 | 45.51 | x | ○ |
| *34 | 4.95 | 1.42 | 3.48 | 26.39 | 36.74 | x | ○ |
| *35 | 144.15 | 31.83 | 4.53 | 54.15 | 53.95 | ○ | x |
| *36 | 197.83 | 34.21 | 5.78 | 47.95 | 47.32 | ○ | x |
| 37 | 56.82 | 16.32 | 3.48 | 59.47 | 59.26 | ○ | ○ |
| 38 | 20.21 | 6.28 | 3.22 | 51.45 | 51.20 | Δ | ○ |
| *39 | 31.32 | 6.02 | 5.20 | 34.22 | 33.40 | x | ○ |
| 40 | 36.22 | 13.33 | 2.72 | 57.63 | 57.73 | ○ | ○ |
| *41 | 86.95 | 17.98 | 4.84 | 38.42 | 40.37 | x | ○ |
| 42 | 53.23 | 15.02 | 3.54 | 56.28 | 56.17 | ○ | ○ |
| *43 | 88.95 | 15.74 | 5.65 | 40.76 | 40.52 | x | ○ |
| 44 | 16.23 | 5.92 | 2.74 | 54.44 | 54.20 | ○ | ○ |
| *45 | 45.84 | 8.16 | 5.62 | 38.65 | 36.95 | x | ○ |

CONCLUSION

Where both PVB and EC are included and prescribed rheological characteristics are ensured, both the printability and the adhesiveness were good. Further, it was understood that the prescribed rheological characteristics could be easily obtained by using carboxylic acid and/or carbodiimide.

What is claimed is:

1. A binder resin for an inorganic particle-dispersed paste, the binder resin comprising a mixture in which a polyvinyl acetal and a cellulose derivative are mixed so as to satisfy 0.2≤X/(X+Y)≤0.8, where X and Y stand for parts by mass of the polyvinyl acetal and the cellulose derivative, respectively, and then further mixed with poly(ethylene glycol) bis(carboxymethyl) ether, wherein
when a paste is obtained by mixing 6 parts by mass, calculated as a solid, of the resin with 100 parts by mass of spherical nickel particles with an average particle diameter of 0.3 μm, 10 parts by mass of barium titanate particles with an average particle diameter of 0.05 μm, 0.5 parts by mass of a nonionic surfactant, 68 parts by mass of dihydroterpineol, and 17 parts by mass of mineral spirit to obtain a resultant mixture, and kneading the resultant mixture by using a three-roll mill, the paste is as follows:
when strains of 0.02 and 0.2 are applied to the paste at an angular frequency of 6.284 rad/s, a value of a phase difference δ between each of the strains and a stress caused by each strain is greater than 45°; and
a ratio of a viscosity of the paste at a shear rate of 4 (1/s) to a viscosity thereof at a shear rate of 40 (1/s) is 4.5 or less.

2. The binder resin for an inorganic particle-dispersed paste according to claim 1, characterized in that the phase difference δ is greater than 50°.

3. An inorganic particle-dispersed paste comprising the binder resin for an inorganic particle-dispersed paste described in claim 1, inorganic particles, and an organic solvent.

4. The inorganic particle-dispersed paste according to claim 3, characterized in that the inorganic particles are particles of nickel.

5. The inorganic particle-dispersed paste according to claim 3, characterized in that a total amount of the binder resin, inorganic particles, and organic solvent with respect to the inorganic particle-dispersed paste is 95 mass % or more.

6. A binder resin for an inorganic particle-dispersed paste, the binder resin comprising a mixture in which a polyvinyl acetal and a cellulose derivative are mixed so as to satisfy 0.2≤X/(X+Y)≤0.8, where X and Y stand for parts by mass of the polyvinyl acetal and the cellulose derivative, respectively, and then further mixed with carbodiimide or carbodiimide and carboxylic acid, wherein
when a paste is obtained by mixing 6 parts by mass, calculated as a solid, of the resin with 100 parts by mass of spherical nickel particles with an average particle diameter of 0.3 μm, 10 parts by mass of barium titanate particles with an average particle diameter of 0.05 μm, 0.5 parts by mass of a nonionic surfactant, 68 parts by mass of dihydroterpineol, and 17 parts by mass of mineral spirit to obtain a resultant mixture, and kneading the resultant mixture by using a three-roll mill, the paste is as follows:

when strains of 0.02 and 0.2 are applied to the paste at an angular frequency of 6.284 rad/s, a value of a phase difference δ between each of the strains and a stress caused by each strain is greater than 45°; and a ratio of a viscosity of the paste at a shear rate of 4 (1/s) to a viscosity thereof at a shear rate of 40 (1/s) is 4.5 or less.

7. The binder resin for an inorganic particle-dispersed paste according to claim 6, characterized in that a mixing amount of the carboxylic acid is 0.2 parts by mass to 10 parts by mass per 100 parts by mass of a total amount of the cellulose derivative and polyvinyl acetal.

8. The binder resin for an inorganic particle-dispersed paste according to claim 6, characterized in that a mixing amount of the carbodiimide is 0.1 parts by mass to 5 parts by mass per 100 parts by mass of a total amount of the cellulose derivative and polyvinyl acetal.

9. The binder resin for an inorganic particle-dispersed paste according to claim 6, characterized in that the carboxylic acid is poly(ethylene glycol) bis(carboxymethyl) ether.

10. The binder resin for an inorganic particle-dispersed paste according to claim 6, characterized in that the carbodiimide is at least one of N,N'-diisopropylcarbodiimide and 1-[3-(dimethylamino)propyl]-3-ethylcarbodiimide.

11. An inorganic particle-dispersed paste comprising:
a binder resin comprising a mixture in which a polyvinyl acetal and a cellulose derivative are mixed so as to satisfy 0.2≤X/(X+Y)≤0.8, where X and Y stand for parts by mass of the polyvinyl acetal and the cellulose derivative, respectively, and then further mixed with carbodiimide or carbodiimide and carboxylic acid;
inorganic particles; and
an organic solvent, wherein
a total amount of the binder resin, the inorganic particles, and the organic solvent with respect to the inorganic particle-dispersed paste is 95 mass % or more,
when strains of 0.02 and 0.2 are applied to the paste at an angular frequency of 6.284 rad/s, a value of a phase difference δ between each of the strains and a stress caused by each strain is greater than 45°; and
a ratio of a viscosity of the paste at a shear rate of 4 (1/s) to a viscosity thereof at a shear rate of 40 (1/s) is 4.5 or less.

12. The inorganic particle-dispersed paste according to claim 11, characterized in that a specific surface area of the inorganic particles measured by a BET method is 5.2 m$^2$/g or more.

13. The inorganic particle-dispersed paste according to claim 11, characterized in that the phase difference δ is greater than 50°.

14. The inorganic particle-dispersed paste according to claim 11, characterized in that the inorganic particles are particles of nickel.

15. An inorganic particle-dispersed paste comprising:
a binder resin comprising a mixture in which a polyvinyl acetal and a cellulose derivative are mixed so as to satisfy 0.2≤X/(X+Y)≤0.8, where X and Y stand for parts by mass of the polyvinyl acetal and the cellulose derivative, respectively, and then further mixed with poly(ethylene glycol) bis(carboxymethyl) ether;
inorganic particles; and
an organic solvent, wherein
a total amount of the binder resin, the inorganic particles, and the organic solvent with respect to the inorganic particle-dispersed paste is 95 mass % or more,
when strains of 0.02 and 0.2 are applied to the paste at an angular frequency of 6.284 and rad/s, a value of a phase difference δ between each of the strains and a stress caused by each strain is greater than 45°; and
a ratio of a viscosity of the paste at a shear rate of 4 (1/s) to a viscosity thereof at a shear rate of 40 (1/s) is 4.5 or less.

\* \* \* \* \*